United States Patent
Chen et al.

(10) Patent No.: US 11,094,187 B2
(45) Date of Patent: Aug. 17, 2021

(54) SUM STREAM FOR ACTUAL STATES AND CONTROL SIGNALS OF A DISTRIBUTED CONTROL SYSTEM

(71) Applicant: SIEMENS AKTIENGESELLSCHAFT, Munich (DE)

(72) Inventors: Feng Chen, Feucht (DE); Franz-Josef Götz, Heideck (DE); Marcel Kiessling, Velden (DE); An Ninh Nguyen, Nuremberg (DE); Jürgen Schmitt, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 29 days.

(21) Appl. No.: 16/632,212

(22) PCT Filed: Jul. 9, 2018

(86) PCT No.: PCT/EP2018/068467
§ 371 (c)(1),
(2) Date: Jan. 17, 2020

(87) PCT Pub. No.: WO2019/016003
PCT Pub. Date: Jan. 24, 2019

(65) Prior Publication Data
US 2020/0211363 A1    Jul. 2, 2020

(30) Foreign Application Priority Data
Jul. 20, 2017 (EP) .................................. 17182304

(51) Int. Cl.
G08B 25/00 (2006.01)
G05B 19/418 (2006.01)
(Continued)

(52) U.S. Cl.
CPC ....... *G08B 25/009* (2013.01); *G05B 19/4185* (2013.01); *G08B 25/007* (2013.01);
(Continued)

(58) Field of Classification Search
CPC .. G08B 25/009; G08B 25/007; G08B 25/008; G05B 19/4185; G05B 2219/32136;
(Continued)

(56) References Cited

U.S. PATENT DOCUMENTS

2007/0076243 A1    4/2007  Janssen et al.
2013/0235857 A1*   9/2013  Seceleanu ............. H04W 28/08
                                                                370/336
(Continued)

FOREIGN PATENT DOCUMENTS

DE    10 2015 213 845 A1    1/2017
WO    WO 2005/066728 A1     7/2005

OTHER PUBLICATIONS

PCT International Search Report and Written Opinion of International Searching Authority dated Nov. 13, 2018 corresponding to PCT International Application No. PCT/EP2018/068467 filed Sep. 7, 2018.

*Primary Examiner* — Ojiako K Nwugo
(74) *Attorney, Agent, or Firm* — Henry M. Feiereisen LLC (57) ABSTRACT

Sensors of a control system transmit detected cyclical actual states of a technical industrial process to a common central unit via a first protected connection of a first open communication network once within a specified time window. The central unit transmits cyclical control signals commensurate with the actual states to multiple actuators via a second protected connection of a second open communication network once within the specified time window. Each sensor supplies the actual state detected by the sensor to the first
(Continued)

open communication network within a respective transmitter-side sub-region within the time window. The central unit receives the transmitted actual states within a respective corresponding receiver-side sub-region within the time window. The transmitter-side sub-regions of the sensors are specified such that the receiver-side sub-regions are disjointed from one another.

6 Claims, 6 Drawing Sheets

(51) Int. Cl.
*H04L 12/825* (2013.01)
*H04L 29/08* (2006.01)

(52) U.S. Cl.
CPC ............ *G08B 25/008* (2013.01); *H04L 47/25* (2013.01); *H04L 67/12* (2013.01)

(58) Field of Classification Search
CPC ... G05B 19/054; G05B 19/0423; H04L 47/25; H04L 67/12
See application file for complete search history.

(56) References Cited

U.S. PATENT DOCUMENTS

| | | |
|---|---|---|
| 2017/0026144 A1 | 1/2017 | Zinner |
| 2017/0163744 A1 | 6/2017 | Lida et al. |
| 2017/0285622 A1* | 10/2017 | Figoli ..................... H04L 69/08 |
| 2017/0307215 A1* | 10/2017 | Tynkov ................... F23N 1/102 |
| 2017/0318761 A1* | 11/2017 | Rainone .................. H04W 4/70 |
| 2018/0113830 A1* | 4/2018 | Sherriff ............... G06F 13/4068 |
| 2018/0295185 A1* | 10/2018 | Kopetz .................. H04L 67/12 |
| 2019/0085957 A1* | 3/2019 | Matsuto ................ F16C 33/581 |

* cited by examiner

SUM STREAM FOR ACTUAL STATES AND CONTROL SIGNALS OF A DISTRIBUTED CONTROL SYSTEM

CROSS-REFERENCES TO RELATED APPLICATIONS

This application is the U.S. National Stage of International Application No. PCT/EP2018/068467, filed Jul. 9, 2018, which designated the United States and has been published as International Publication No. WO 2019/016003 A1 and which claims the priority of European Patent Application, Serial No. 17182304.0, filed Jul. 20, 2017, pursuant to 35 U.S.C. 119(a)-(d).

BACKGROUND OF THE INVENTION

The present invention is based on a control method for a technical industrial process,
  wherein sensors of a control system cyclically detect actual states of the technical industrial process and transmit same to a common central unit of the control system so that within a specified time window each sensor transmits the actual states detected by the sensor to the common central unit once within a specified time window,
  wherein the common central unit cyclically transmits control signals for the technical industrial process while taking into consideration the actual states transmitted to the central unit and transmits said control signals to actuators of the control system so that the common central unit transmits the control signals determined for the respective actuator to each actuator once within the specified time window,
  wherein the actuators act cyclically on the technical industrial process in a manner corresponding to the control signals transmitted to the actuators.

The present invention is furthermore based on a control system for a technical industrial process,
  wherein the control system has a plurality of sensors, a plurality of actuators and a common central unit.

Control systems are known in various embodiments. Historically, control systems were first constructed with an independent communications system, for example, a dedicated bus of a programmable logic controller. Developments then led to field bus systems in which the sensors and the actuators were connected to the common central unit via a field bus—for example, the PROFIBUS.

More recently, Ethernet-based field buses have also been used. Such a field bus is a typical example of an open communication network.

An open communication network is a communication network in which each component connected to the communication network feeds data into the communication network according to its own specifications and reads data transmitted via the communication network. On the other hand, the connected components do not know which other components are connected to the communication network. In particular, additional components that have nothing to do with the controller can thus also be connected to an open communication network which is used in the context of the present invention. If—purely by way of example the central unit, the sensors and the actuators are connected to the communication network as components, additional components can be present which communicate with one another, but with neither the central unit nor the sensor nor the actuators, although they communicate with at least one of these components, but not within the control method. Furthermore—at least as a rule—the topology of the open communication network is not known to the connected components.

In the process industry and industrial automation, the technical industrial processes to be controlled are usually relatively sluggish. Cycle times in the terminology of the present invention "time windows"—may be in the range of several milliseconds, often even in a range above 50 ms or 100 ms. As a rule, a communication network based on Ethernet can also be used for such cycle times.

A control method for a technical process in the form of control of components within a vehicle is known from DE 10 2015 213 845 AI. In the context of this control method, sensors of a control system cyclically detect actual states of the technical industrial process and transmission of the actual states via a first open communication network to a common central unit of the control system. The common central unit cyclically ascertains control signals for the technical industrial process while taking into consideration the actual states transmitted to the central unit and transmits said control signals to actuators of the control system via a second open communication network. The actuators act cyclically on the technical process corresponding to the control signals transmitted to the actuators. The actual states are emitted by the sensor in a cyclical manner. Reception by the common central unit within predetermined times, however, cannot be ensured with certainty. The same applies to the reverse communication of the common central unit to the actuators. In the case of the document D1, different times can be specified at which the individual sensors transmit their actual states to the central unit.

In the context of the transmission of audiovisual data streams, specially protected connections for open communication networks are known in the prior art, so-called streams. A stream is a connection between a first component and a second component, both of which are connected to the open communication network. In the case of a stream, it is ensured that data fed to the first component—the so-called talker—arrives at the second component—the so-called listener—with a maximum delay known in advance. The maximum delay is dependent on the line sections and the individual nodes between successive line sections from the first to the second component. The maximum delay is established when the stream is set up.

The measures known for the audiovisual transmission of data can in principle also be applied in the industrial environment. However, there is an important difference between audiovisual data and industrial data. With audiovisual data, large amounts of data must usually be transferred from exactly one talker to exactly one listener. In industrial applications, on the other hand, the amount of data to be transferred is already considerably smaller. Usually only a few bytes, a maximum of a few Kbyte, must be transferred per cycle. Furthermore, in industrial applications, not just two but many components are involved in communication. In particular, for the transmission of the actual states, each sensor is a talker, while the central unit is a listener for this purpose. Conversely, for the transmission of the control signals, the central unit is a talker, while each actuator is a listener.

If the measures known from the audio-visual transmission of data were to be taken over directly and indirectly, a multiplicity of streams would have to be set up, namely a separate stream for each sensor and each actuator in each case, wherein in the case of the sensors the respective sensor is the talker and the central unit is the listener, and in the case of the actuators the central unit is the talker and each actuator is a listener. Each stream uses considerable resources at every node of the communication network over which the stream is routed. This approach therefore proves to be possible in principle, but not practicable.

In the prior art, the data of control systems (i.e. the actual states detected by the sensors and the control signals to be transmitted to the actuators or, in general, the process image) are therefore transmitted without further protection. In the transmission, a high priority is selected, and a rough estimate of the bandwidth required for this is carried out.

Insofar as it relates to the control signals to be transmitted from the common central unit to the actuators, the procedure of the prior art is relatively problem-free. In particular, it can be ensured in a relatively simple manner on the part of the common central unit that the control signals for the actuators are fed sequentially one after the other into the open communication network. However, the sensors feed their actual states in an uncoordinated manner into the open communication network. Therefore, "beats" can occur in the communication network. A beat occurs when a plurality of sensors feed their actual states into the communication network in such a way that a short-term overload occurs at the central unit or at one of the nodes. Due to the overload, the data of one of the relevant sensors cannot be buffered by the central unit or the affected node, resulting in a loss of data, Such data loss usually leads to a disruption of the control process as such.

Other events may also affect the control process. For example, due to another communication not associated with the control process as such, the latency time of individual nodes may change. This can also lead to a brief overload of a node.

Such problems could be avoided by setting up streams between the components involved (sensors, common central unit, actuators). However, setting up streams between only two components, as is the case by default, is impracticable.

The object of the present invention is to create possibilities for realizing protected communication between the components involved at reasonable cost.

SUMMARY OF THE INVENTION

According to the invention, the object is achieved by a control method of the type mentioned at the beginning, wherein
the sensors transmit the actual states to the common central unit via a first protected connection of a first open communication network common to the sensors,
the common central unit transmits the actual states to the actuators via a second protected connection of a second open communication network common to the actuators and
a respective transmitter-side sub-region is assigned to each sensor within the time window within which the respective sensor feeds the actual states detected by it to the first open communication network,
the transmitted actual states arrive at the central unit within a respective receiver-side sub-region of the time window corresponding to the respective transmitter-side sub-region and
the transmitter-side sub-regions of the sensors are determined in such a way that the receiver-side sub-regions are disjointed relative to one another.
Advantageous embodiments of the control method are the subject of the dependent claims.

According to the invention, a total of only two protected connections are thus set up, namely on the one hand the first protected connection between the sensors and the common central unit and on the other hand the second protected connection between the common central unit and the actuators.

Communication from the common central unit to the actuators via the common second protected connection is relatively easy. This is because, in deviation from the usual procedure in audio-visual streams, there are more than two participants. However, only one of the participants, namely the common central unit, feeds data into the second protected connection. The common central unit can therefore sequentially output the control signals to the actuators. Each actuator can listen in and filter out the control signals intended for it from the data transmitted via the second shared protected connection.

With regard to the communication from the sensors to the common central unit, however, just like in the prior art, none of the sensors "knows" that the other sensors also transmit the actual states detected by them to the central unit via the common first protected connection. In order to ensure that time conflicts do not occur in the transmission of the actual states to the common central unit, each participating sensor within the time window is therefore assigned the respective transmitter-side sub-region within which the respective sensor feeds the actual states detected by it to the first open communication network. As a result, it can be ensured that the transmitted actual states arrive sequentially in succession at the central unit.

In order to correctly determine the sub-regions on the transmitter side for data transmission via the first protected connection, it has proven to be advantageous
for the respective transmitter-side sub-region within the time window to first be temporarily set for the sensors,
for each transmitter-side sub-region, for it to then be determined which receiver-side sub-region corresponds to the respective transmitter-side sub-region on the side of the common central unit, and
finally for the transmitter-side sub-regions to be displaced within the time window such that the receiver-side sub-regions are disjointed relative to one another.

As a rule, a certain safety distance between the receiver-side sub-regions is also maintained. This is not absolutely necessary, however.

The communication from the respective sensor to the common central unit takes place via a respective sequence of sequentially successive line sections of the first open communication network. In this case, directly adjoining line sections of the respective sequence are connected to one another via one node (a so-called bridge) respectively. Each node forwards the actual states transmitted by the respective sensor with a respective delay time. For each protected connection in which it is involved, each node furthermore ensures that the delay time with which it forwards the data it receives lies between a minimum value predetermined for the respective node and a maximum value predetermined for the respective node. This applies to each protected connection and thus also the first protected connection of the first communication network. On the basis of the transmitter-side sub-region assigned to the respective sensor, it is thus possible, by adding up the predetermined minimum values of the nodes, to determine an earliest possible time at which the corresponding actual states can arrive at the common central unit at the earliest. In an analogous manner, starting from the transmitter-side partial region assigned to the respective sensor, it is possible, by adding up the predetermined maximum values of the nodes, to determine the latest possible time at which the corresponding actual states can arrive at the common central unit at the latest. The respective receiver-side sub-region is thus determined by the earnest possible time and the latest possible time. If the transmitter-side sub-region is later shifted, the corresponding receiver-side part-region shifts 1:1 with this displacement. Thus, for example, if the transmitter-side sub-region is advanced by 50 μs, the corresponding receiver-side sub-region also shifts forward by 50 μs.

The maximum values of the nodes must be explicitly given. The minimum values may be given explicitly. Alternatively, it is possible for the predetermined minimum values to be set to zero.

As a rule, the first open communication network and the second open communication network have at least one common line section via which both the actual states to the common central unit and the control signals to the actuators are transmitted. In particular, only a single Ethernet is often provided as a (common) communication network to which the common central unit is connected once (1x), so that all communications of the common central unit with the sensors and the actuators must necessarily take place via this connection.

The object is furthermore achieved by a control system having the features of claim 6. According to the invention, a control system of the type mentioned at the beginning is configured in that the sensors and the common central unit are connected to one another via a first open communication network,
the common central unit and the actuators are connected to one another via a second open communication network and
the sensors, the common central unit, the actuators, the first open communication network and the second open communication network are designed in such a way that, during operation, they interact with one another according to a control method according to one of the above claims.

The above-described characteristics, features and advantages of this invention, as well as the manner in which they are achieved, will be clearer and more explicitly understood in connection with the following description of the exemplary embodiments, which are explained in greater detail in connection with the drawings. Here, in a diagrammatic view:

DETAILED DESCRIPTION OF PREFERRED EMBODIMENTS

Figure 1:
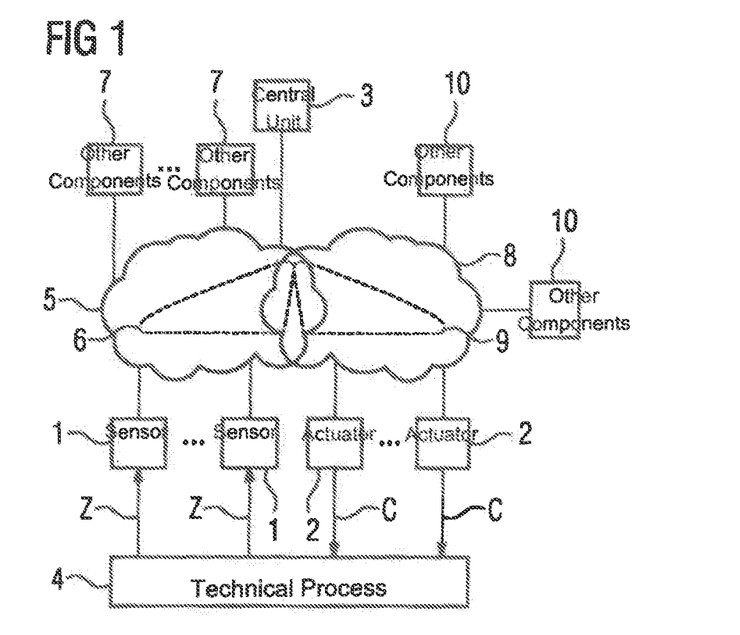
FIG. 1 shows a control system and a technical industrial process.

According to FIG. 1 a control system has a plurality of sensors 1, a plurality of actuators 2 and a common central unit 3, The central unit 3 can be, for example, a programmable logic controller or a central unit of a programmable logic controller. The sensors 1 and the actuators 2 are peripheral devices.

The sensors 1 cyclically detect actual states Z of a technical industrial process 4, for example a production machine or a chemical process. The actual states Z can be, for example, position signals, temperatures, binary signals such as, for example, the response of a limit switch, etc. Subsequently, it is assumed that each sensor 1 detects a single actual state Z, However, the sensors 1 could also each detect a plurality of actual states Z.

The sensors 1 and the central unit 3 are connected to one another via a first open communication network 5. Within the first open communication network 5, the sensors 1 transmit the actual states Z detected by them via a first protected connection 6 to the central unit 3. The first protected connection 6 is common to the sensors 1.

The communication network 5 is therefore an open communication network because other components 7 can also be connected to the communication network 5, which can transmit different data independently of the actual states Z via the communication network 5. It is possible that the other components 7 communicate only with one another, but neither with the central unit 3 nor with the sensor 1. However, it is also possible for the other components 7 to also communicate with the central unit 3 and/or with the sensors 1. In this case, however, communication takes place outside of the control method according to the invention. The first open communication network 5 can, for example, be designed as Ethernet.

The first protected connection 6 is a protected connection because the type of connection 6 ensures that data which is transmitted from the sensors 1 via the first protected connection 6 to the central unit 3 arrives at the central unit 3 in a predetermined maximum latency time. Between the feeding of the data—here of the respective actual state Z detected by the respective sensor 1—into the first open communication network 5 by one of the sensors 1 and the arrival of this data at the central unit 3, the maximum latency elapses. The latency can vary from sensor 1 to sensor 1. But it is given for each sensor 1. An example of a protected connection 6 is a stream as defined for example by the AVB (=Audio/Video Bridging) Task Group and in particular by the TSN (=Time Sensitive Networking) Task Group in the international standard IEEE 802.1.

A stream is generally defined between a single transmitter (talker) and a single receiver (listener), In the present case, however, a plurality of transmitters is present, namely the sensors 1. It is known, however, to set up a stream between a plurality of transmitters and a single receiver (here the central unit 3). Reference may be made purely by way of example to PCT/EP2017/055643, filed on Mar. 10, 2017, by the applicant Siemens AG. Further details for setting up will be explained later.

Figure 2:
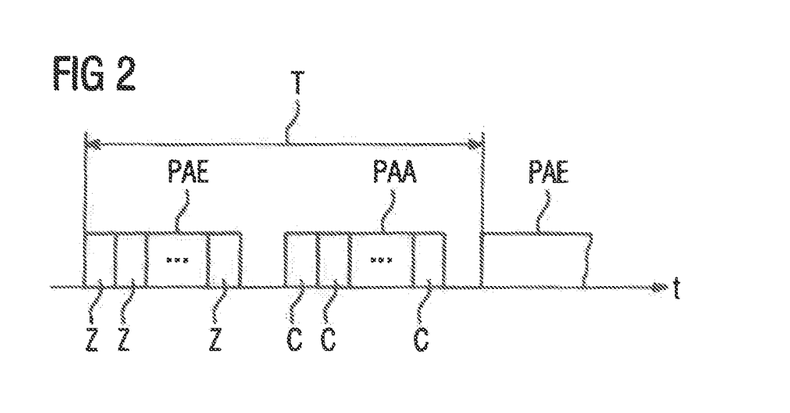
FIG. 2 shows a timing diagram.

The actual states Z are transmitted to the central unit 3, as is the detection of the actual states Z by the sensors 1, in a cyclical manner. Thus, in accordance with the representation in FIG. 2, each sensor 1 transmits the actual states Z detected by it once (1x) to the central unit 3 within a predetermined time window T. The totality of the actual states Z forms the so-called process image of the PAE inputs.

In a manner known per se, the central unit 3 cyclically determines control signals C for the technical industrial process 4. The central unit 3 here takes into account the actual states Z transmitted to it and, if appropriate, further internal data such as, for example, flags and timers. The corresponding procedure is generally known for programmable logic controllers. The control signals C can, for example, cause a heater, an actuator, a lamp, etc. to be switched on or off. It can be a binary signal, a discrete signal, or an analog signal. The latter are then determined by the central unit 3 in digital form and transmitted to the actuators 2. They are only converted from digital to analog form after transmission to the actuators 2.

The central unit 3 and the actuators 2 are connected to one another—analogously to the connection of the central unit 3 and the sensors 1—via a second open communication network 8. Within the second open communication network 8, the central unit 3 transmits the control signals C determined by it via a second protected connection 9 to the actuators 2. The second protected connection 9 is common to the actuators 2. The totality of the control signals C forms the so-called process image of the PAA outputs. Subsequently, it is assumed that the central unit 3 determines a single control signal C for each actuator 2. However, the central unit 3 could also determine a plurality of control signals C for each of the actuators 2.

The communication network 8 is therefore an open communication network because other components 10 can also be connected to the communication network 8, which can independently transmit data different from the control signals C via the second open communication network 8. It is possible that the other components 10 communicate only with one another, but neither with the central unit 3 nor with the actuators 2. However, it is also possible for the other components 10 to also communicate with the central unit 3 and/or with the actuators 2. In this case, however, communication takes place outside the control method according to the invention. The second open communication network 8 can be configured analogously to the communication network 5, for example, as Ethernet.

The second protected connection 9 is a protected connection because the type of connection 9 ensures that data which is transmitted from the central unit 3 via the second protected connection 9 to the actuators 2 arrives at the actuators 2 within a predetermined maximum latency time. Between the feeding of the data—here the respective control signal C determined for the respective actuator 2—into the second open communication network 8 by the central unit 3 and the arrival of this data at the respective actuator 2, the maximum latency elapses. The latency may vary from actuator 2 to actuator 2. However, it is given for each actuator 2.

An example of a protected connection 9 is—as before—a stream as defined by the Audio/Video Bridging Task Group and in particular by the Time-Sensitive Networking Task Group in the international standard IEEE 802.1. Analogously to establishing a stream between a plurality of transmitters and a single receiver, it is also known to establish a stream between a single transmitter (here the central unit 3) and a plurality of receivers (here the actuators 2). This corresponds to the standard principle, as defined by the AVB Task Group and in particular by the TSN Task Group in the IEEE 802.1 standard.

The control signals C are transmitted to the actuators 2 cyclically. Thus, in accordance with the illustration in FIG. 2, the central unit 3 transmits to each actuator 2 once (1x) the control signal C determined for the respective actuator 2 within the predetermined time window T. The actuators 2 then act on the technical industrial process 4 in accordance with the control signals C transmitted to them. The action on the technical industrial process 4 also takes place cyclically.

Figure 3:
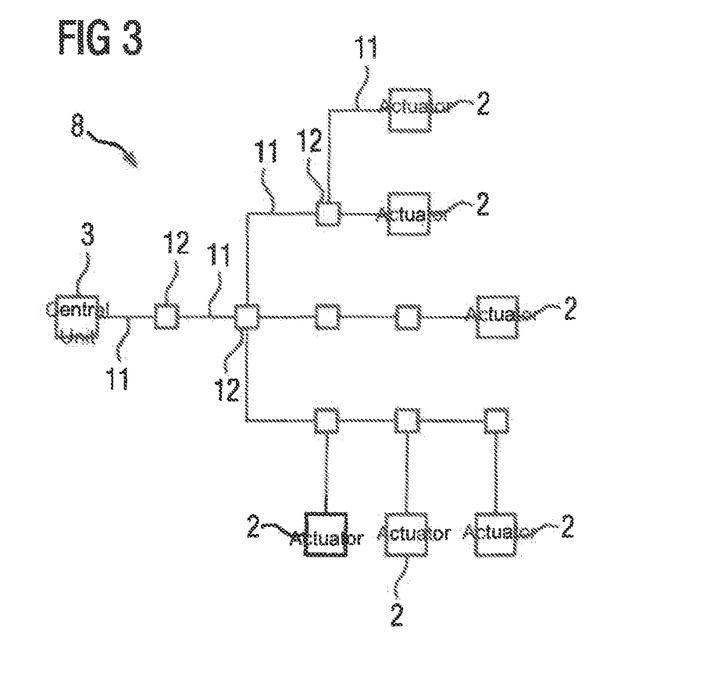
FIG. 3 shows a protected connection.

The establishment of the second protected connection 9 is explained below. It is assumed here that the logical or physical structure of the second open communication network 8, as far as the central unit 3 and the actuators 2 are concerned, is as shown in FIG. 3. However, the topology of the second open communication network 8 may also be different. In particular, it does not have to be known in advance.

According to FIG. 3, each actuator 2 is connected to the central unit 3 via a respective sequence of line sections 11 of the second open communication network 8. Communication from the central unit 3 to the respective actuator 2 takes place via the respective sequence. Directly adjacent line sections 11 are connected to one another via a respective node 12, The reference characters 11 and 12 in FIG. 3 are shown only for the path from the central unit 3 to one of the actuators 2.

The nodes 12—in a stream, usually referred to as bridges—forward the data they receive. In the case of an unprotected connection, the delay occurring here is not predetermined. In the case of a protected connection—here of the second protected connection 9—the nodes 12 forward the data they have received with a respective maximum delay time. The nodes 12 can ensure this because when the second protected connection 9 is set up, each node 12 involved checks whether its internal resources are sufficient for the performance required in the context of the protected connection to be set up (in particular with regard to data volume and data throughput), if this is the case, the respective node 12 reserves these resources for the protected connection to be set up. Otherwise, a corresponding message is sent to a device setting up the protected connection. The protected connection is not set up in this case. As a result of this procedure, each participating node 12 can ensure that the required performance is maintained during later operation.

During later operation, it is not known in advance with what actual delay time the respective node 12 forwards the control signals C fed by the central unit 3 into the second protected connection 9. However, the maximum delay time (i.e. its maximum value) remains guaranteed. It may also be possible, in an individual case, for the respective node 12 to also specify a minimum delay time. Alternatively, it can be assumed that the minimum delay time (i.e. its minimum value) has the value zero.

Figure 4:
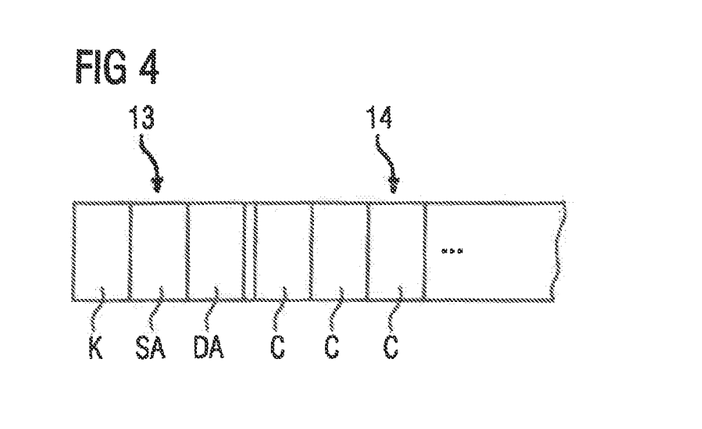
FIG. 4 shows a data packet.

Data transmission via the second protected connection 9 takes place in the form of individual data packets (frames) which, according to FIG. 4, comprise a header 13 and user data 14. The control signals C are components of the user data 14. The header 13 comprises, on the one hand, an identifier K for the second protected connection 9 as such and, on the other hand, a logical source address SA and a logical destination address DA. In order to set up the second protected connection 9, it is thus necessary, in particular, for each actuator 2 to be assigned one and the same logical destination address DA. As a result, the central unit 2 thus transmits all control signals C in the second protected connection 9 to each actuator 2. Thus, each actuator 2 is able to filter out and use the control signals C relevant to it. Time conflicts between the individual control signals C cannot occur with this procedure as only a single transmitter (the central unit 3) is present and the central unit 3 is consequently the root of the second protected connection 9.

Figure 5:
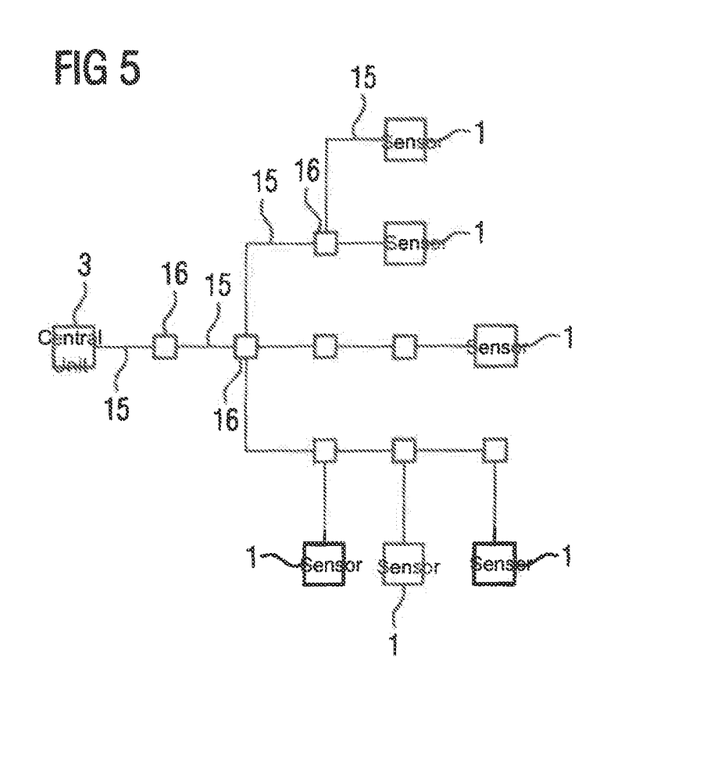
FIG. 5 shows a further protected connection.

The establishment of the first protected connection 6 is explained below. It is assumed here that the logical or physical structure of the first open communication network 5, as far as the central unit 3 and the sensors 1 are concerned, is as shown in FIG. 5. However, the topology of the first open communication network 5 can also be different. In particular, it does not have to be known in advance.

As shown in FIG. 5, the topology of the first open communication network 5 is similar to the topology of the second open communication network 8. However, this is not absolutely necessary.

According to FIG. 5, each sensor 1 is connected to the central unit 3 via a sequence of line sections 15 of the first open communication network 5, The communication from the sensors 1 to the central unit 3 takes place via the respective sequence. Directly adjacent line sections 15 are connected to one another via a respective node 16. In MG 5 the reference characters 15 and 16 are only shown for the path from one of the sensors 1 to the central unit 2.

The nodes 16—in a stream usually referred to as bridges—forward the data they receive. In the case of an unprotected connection, the delay occurring here is not predetermined. In the case of a protected connection—here of the first protected connection 6—the nodes 16 forward the data they have received with a respective maximum delay time. The nodes 16 can ensure this because when the first protected connection 6 is set up, each node 16 involved checks whether its internal resources are sufficient for the performance required in the context of the protected connection to be set up (in particular with regard to data volume and data throughput). If this is the case, the respective node 16 reserves these resources. Otherwise, a corresponding message is sent to a device that sets up the protected connection. In this case, the protected connection is not set up. Due to this procedure, each node 16 involved can ensure that the required performance is maintained during later operation.

During later operation, it is not known in advance with which actual delay time the respective node 16 forwards the actual states Z fed into the first protected connection 6 by the respective sensor 1. However, the maximum delay time (i.e. its maximum value) remains ensured. It may also be possible, in an individual case, for the respective node 16 to also specify a minimum delay time. Alternatively, it may be assumed that the minimum delay time (i.e. its minimum value) has the value zero.

Figure 6:
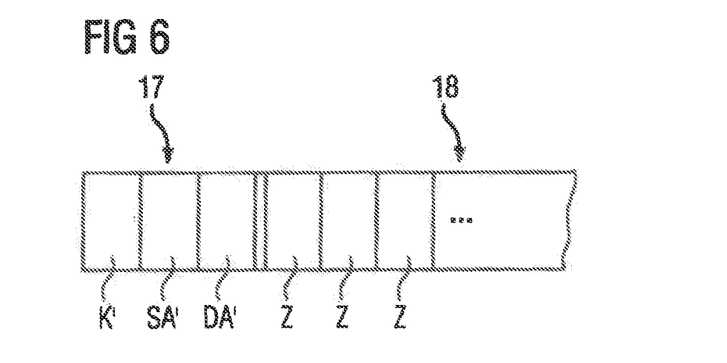
FIG. 6 shows a further data packet.

Data transmission via the first protected connection 6 takes place in the same manner as via the second protected connection 9. Thus, transmission takes place in the form of individual data packets (frames) which, according to FIG. 6, comprise a header 17 and user data 16. The actual states Z are components of the user data 18. The header 17 on the one hand, contains an identifier K' for the first protected connection 6 as such and, on the other hand, a logical source address SA' and a logical destination address DA'. In order to set up the first protected connection 6, it is possible for each sensor 1 to be assigned one and the same logical source address SA'. However, it is also possible for different logical source addresses SA' to be assigned to the sensors 1. In both cases, the sensors 1 in the first protected connection 6 transmit all actual states to the central unit 3

In contrast to the second protected connection 9, in the case of the first protected connection 6, there are a plurality of transmitters, namely the sensors 1. However, the sensors 1 "know" nothing of one another. If, therefore, the sensors 1 are only required to transmit their respective actual states Z to the central unit 3 within the time window T via the first protected connection 6, it can happen that the actual states Z, which are transmitted from different sensors 1 to the central unit 3, arrive at the central unit 3 or one of the nodes 16 simultaneously, so that they cannot be accepted by the central unit 3 or the corresponding node 16, In this case, data would be lost.

Figure 7:
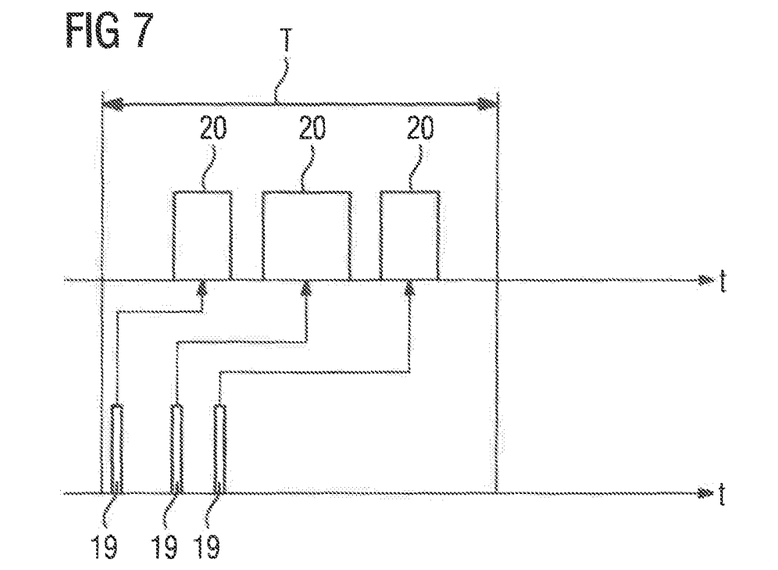
FIGS. 7 to 11 show timing diagrams.

To avoid such time conflicts during the transmission of the actual states Z to the central unit 3, a respective transmitter-side sub-region 19 is assigned to each sensor 1 within the time window T in accordance with the illustration in FIG. 7, The sensor 1 supplies the actual states Z detected by it within the sub-region 19 assigned to it to the first open communication network 5. The respective sub-region 19 therefore does not relate to the entire transmission from the respective sensor 1 to the central unit 3, but only to the first element in the transmission chain, i.e. the feeding into the line section 15 adjoining the respective sensor 15. The possibility of assigning transmitter-side sub-regions 19 to a specific transmitter (here the sensors 1) is known as such, Reference may again be made purely by way of example to the international standard IEEE 802.1 and in particular to the extensions in IEEE 802.1 Qcc. Corresponding procedures are also known from PROFINET IRT.

Figure 8:
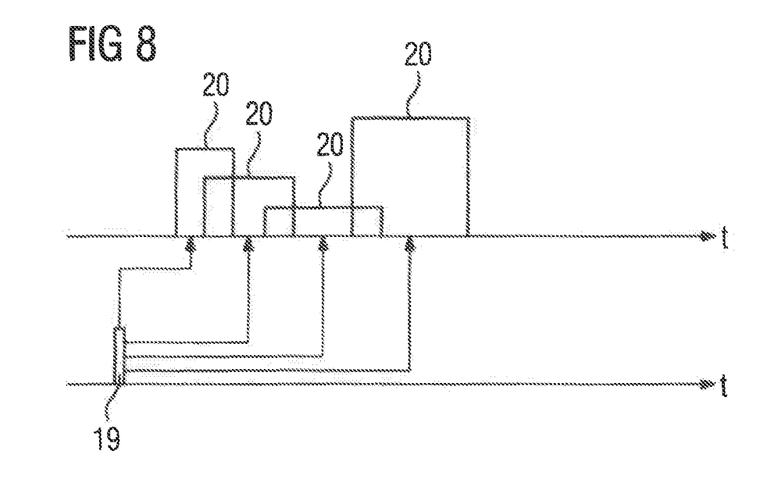

Receiver-side sub-regions 20 correspond to the transmitter-side sub-regions 19. The receiver-side sub-regions 20 are those time regions within which the actual states Z fed into the first open communication network 5 by one of the sensors 1 in its transmitter-side sub-region 19 arrive at the central unit 3, The transmitter-side sub-regions 20 must be disjointed relative to one another. In order to ensure this, the respective transmitter-side sub-region 19 is initially only temporarily set for each sensor 1. For this preliminary approach—but only for this—the sub-regions 19 on the transmitter side can even correspond to the illustration in FIG. 8. Then, for each sub-region 19 on the transmitter side, it is determined which receiver-side sub-region 20 corresponds to the respective transmitter-side sub-region 19 on the side of the central unit 3. FIG. 8 also shows the corresponding receiver-side sub-regions 20, The receiver-side sub-regions 20 are shown at different heights in FIG. 8 in order to be able to recognize and distinguish them from one another in spite of their temporal overlap in FIG. 8.

Figure 9:
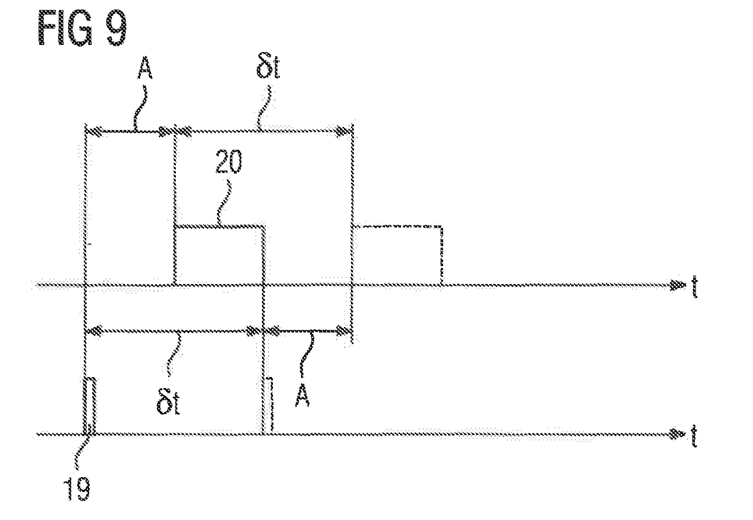
Figure 10:
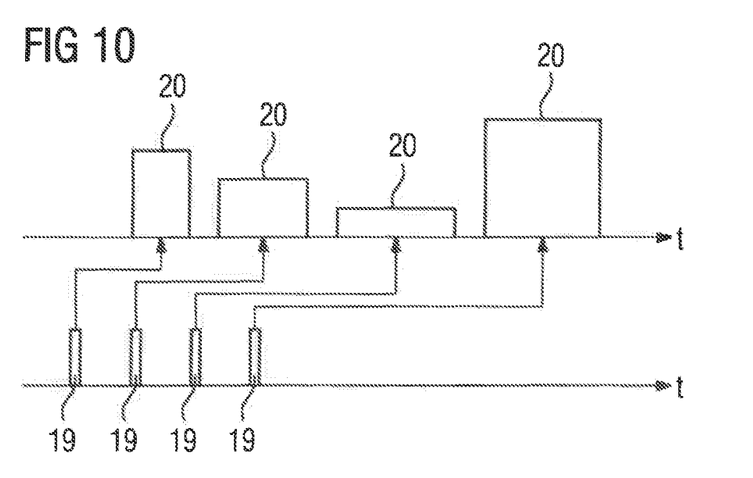

It is of crucial importance that, according to FIG. 9, the time offset A to the corresponding receiver-side sub-region 20 is constant for each transmitter-side sub-region 19. If, therefore, corresponding to the dashed representation in FIG. 9, a transmitter-side sub-region 19 is shifted by a certain period of time δt, the corresponding receiver-side sub-region 20 also shifts by exactly this period of time δt. Thus, the time offset A is maintained unchanged. It is therefore possible, according to the illustration in FIG. 8, firstly to determine the associated receiver-side sub-regions 20 for any transmitter-side sub-regions 19 and then to arrange the receiver-side sub-regions 20 in accordance with the representation in FIG. 10 within the time window T in such a way that they are disjointed relative to one another. Preferably, a safety distance is maintained between the receiver-side sub-regions 20. However, this is not absolutely necessary.

The associated time shifts can be readily determined. As a result of the fact that the time offset A to the respective corresponding transmitter-side sub-region 19 does not change, the corresponding transmitter-side sub-regions 19 can therefore also be determined without difficulty. It is only necessary to shift the transmitter-side sub-regions 19 1:1 in order to shift the respective receiver-side sub-region 20.

It is possible for the transmitter-side sub-regions 19 to overlap in time after the displacement. However, this is not critical as it is not a question of an overlap of the transmitter-side sub-regions 19, but only the avoidance of an overlap of the receiver-side sub-regions 20.

In order to implement the procedure explained above, the receiver-side sub-regions 20 must be known. The determination of the receiver-side sub-region 20 is explained below for a single transmitter-side sub-region 19. However, the procedure is valid in a completely analogous manner for all transmitter-side sub-regions 19.

Figure 11:
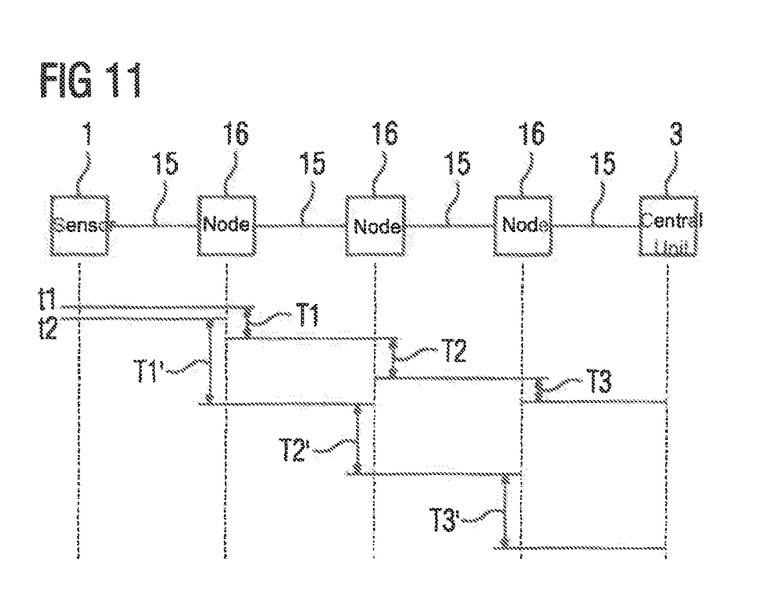

In the following, it is assumed—purely by way of example—in accordance with the illustration in FIG. 11 that the corresponding sensor 1 is connected to the central unit 3 via four sequentially successive line sections 15 and thus correspondingly via three nodes 16 arranged between two of these four line sections 15. Furthermore, it is assumed that the transmission times via the line sections 15 can be ignored as such. If appropriate, however, such transmission times can be taken into account.

The sensor 1 under consideration supplies the actual states Z detected by it within the time window T in the sub-region 19 assigned to it to the first open communication network 5.

The boundaries of this sub-region 19 are subsequently provided with the reference characters t1 and t2. The difference between the two limits, that is to say t2-t1, corresponds to the duration of the corresponding transmitter-side sub-region 19.

Due to disregarding the transmission times via the line sections 15 as such, the transmitted actual states Z arrive in the same period—that is, in the interval extending from t1 to t2—at the node 16 adjacent to the sensor 1. This node 16 supplies the actual states Z to the next line section 15 after a delay time. The exact value of the delay time is not known. However, it is known that the delay time has at least one value T1 and at most one value T1'.

The earliest possible time at which this node 16 supplies the actual states Z to the next line section 15 is consequently at t1+T1. The latest possible time at which this node 16 terminates the supply of the actual states Z to the next line section 15 is therefore still at t2+T1'.

As a result of disregarding the transmission times over the line sections 15 as such, the transmitted actual states Z arrive at the next node 16 at the same time—that is to say, in the interval extending from t1+T1 to t2+T1'. After a delay time, this node 16 also feeds the actual states Z to the line section 15 next to it. The exact value of the delay time is again not known. However, it is known that the delay time has a value of at least T2 and a value of at most T2'.

The earliest possible time at which this node 16 supplies the actual states Z to the next line section 15 is consequently at t1+T1+T2. The latest possible time at which this node 16 terminates the supply of the actual states Z to the next line section 15 is therefore still at t2+T1'+T2'.

This procedure can be repeated for each node 16. In the example given, in which three nodes 16 are arranged between the sensor 1 and the central unit 3, the earliest possible time at which the actual states Z of the sensor 1 under consideration arrive at the central unit 3 is thus t1+T1+T2+T3, where T3 is the minimum delay time of the node 16 adjacent to the central unit 3. Analogously, the latest possible time at which the transmission of the actual states Z of the sensor 1 under consideration to the central unit 3 is terminated is t1+T1'+T2'+T3', where T3' is the maximum delay time of the node 16 adjacent to the central unit 3.

As a result, the respective receiver-side sub-region 20 can thus be determined for each sensor 1 and its transmitter-side sub-region 19, starting from the transmitter-side sub-region 19 assigned to the respective sensor 1, by adding up the predetermined minimum values T1, T2, T3, etc. of the node points 16 and adding up the predetermined maximum values T1', T2', T3', etc. of the node points 16.

The transmitter-side sub-regions 19 are determined in an automated manner via a P2P protocol, for example on the basis of LRP (=Link-local Registration Protocol). After the determination of the transmitter-side sub-regions 19, they are transmitted to the individual sensors 1, for example via the first open communication network 5, but outside the first protected connection 6.

The number of data packets which are transmitted per time window T via the first open communication network 5 and here via the first protected connection 6 from the sensors 1 to the central unit 3 is as a rule as large as the number of sensors 1. This is the case because each sensor 1 transmits the actual states Z detected by it to the central unit 3 via a separate data packet. The resources of the nodes 16 involved hi the first open communication network 5 must therefore be determined in the course of setting up the first protected connection 6 in such a way that they can forward the corresponding number of data packets within the respective specified maximum delay time Ti' (where i=1, 2, 3, etc.).

At least the node 16 of the first open communication network 5 directly adjacent to the central unit 3 must generally be able to handle all the data packets transmitted by the sensors 1, i.e. regardless of the sensor 1 from which the corresponding data packet originates. With regard to the other nodes 16 of the first open communication network 5, it may be sufficient to reserve their resources to a reduced extent for the first protected connection 6.

For the maintenance of the transmitter-side sub-regions 19 by the sensors 1, it is furthermore necessary for the sensors 1 to be synchronized with one another. However, synchronization as such is not the subject of the present invention. Possibilities for synchronization are also generally known to those skilled in the art. They therefore do not need to be explained in detail at this point.

Figure 12:
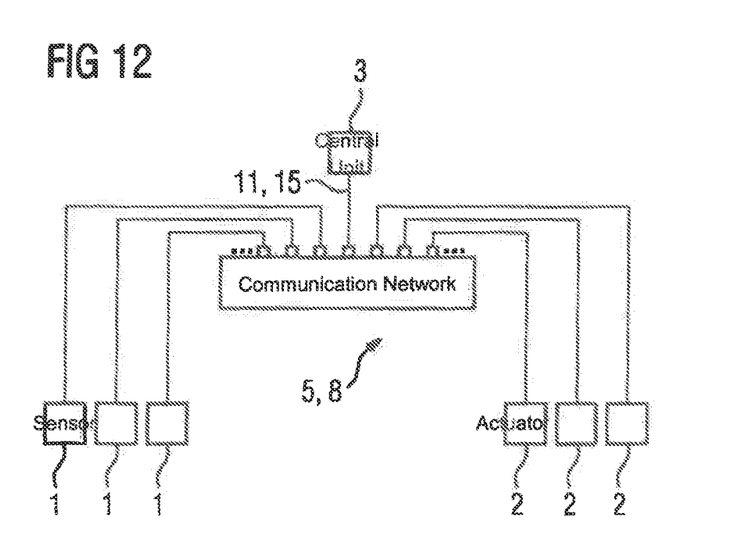
FIG. 12 shows a control system.

As explained above, the first open communication network 5 and the second open communication network 8 are different communication networks. However, this is not absolutely necessary. Rather, the first open communication network 5 and the second open communication network 8 can have at least one common line section 11, 15 corresponding to the representation in FIG. 12 via which both the transmission of the actual states Z to the central unit 3 and the transmission of the control signals C to the actuators 2 takes place. In particular, the central unit 1 is usually only connected to the two open communication networks 5, 8 via a single line section 11, 15. Further line sections 11, 15 can also be a component of both open communication networks 5, 18. Furthermore, it is also possible for peripheral units to be present which comprise both the functionality of a sensor 1 and the functionality of an actuator 2 (so-called mixed I/O units), In this case, the transmission of both the actual states Z to the central unit 3 and the control signals C from the central unit 3 occurs automatically via the same line sections 11, 15.

In summary, the present invention thus relates to the following facts:

Sensors 1 of a control system cyclically detect actual states Z of a technical industrial process 4 and transmit same to a common central unit 3 of the control system via a first protected connection 6 of a first open communication network 5 common to the sensors 1. Thus, each sensor 1 transmits the actual states Z detected by the sensor to the central unit 3 once within a specified time window T. The central unit 3 cyclically ascertains control signals C for the technical industrial process 4 while taking into consideration the actual states Z and transmits said control signals to multiple actuators 2 of the control system via a second protected connection 9 of a second open communication network 8, said connection being common to the actuators

2. The central unit 3 thereby transmits the control signals C determined for the respective actuator 2 to each actuator 2 once within the specified time window T. The actuators 2 act cyclically on the technical industrial process 4 in a manner corresponding to the control signals C transmitted to the actuators, Each sensor 1 is assigned a respective transmitter-side sub-region 19, within which the respective sensor 19 supplies the actual states Z detected by said sensor to the first open communication network 5, within the time window T. The transmitted actual states Z arrive within a respective receiver-side sub-region 19, said sub-region corresponding to the respective transmitter-side sub-region 20 of the time window T in the central unit 3, The transmitter-side sub-regions 19 of the sensors 1 are determined such that the receiver-side sub-regions 20 are disjointed relative to one another.

The present invention has many advantages. In particular, efficient and reliable as well as deterministic communication takes place between the sensor 1, the central unit 3 and the actuators 2 of the control system. Given a realistic depth of communication networks 5, 8 of up to seven nodes 12, 16, there are usually delays between the supply of actual states Z or control signal C to the communication network 5, 8 and their arrival at the central unit 3 or the actuators 2 of a few milliseconds (usually a maximum of 5 ms). Resources in the nodes 12, 16 may be spared. In particular, only one entry for the two protected connections 6, 9 must be managed in the reservation protocol and the data plane of the first and second open communication networks 5, 8. In the event of a fault, the diagnosis is simplified as only a single protected connection 6, 9 has to be tested in both communication directions—to the central unit 3 and away from the central unit 3. Knowledge of the topology of communication networks 5, 8 is not required. A corresponding reservation of resources of the corresponding nodes 16 is only required in those nodes 16 via which the actual states Z of several sensors 1 are forwarded.

Although the invention has been illustrated and described in detail by the preferred embodiment, the invention is not limited by the disclosed examples and other variations can be deduced by a person skilled in the art without departing from the scope of the invention.

The invention claimed is:

1. A method for controlling a technical industrial process, comprising:
   with sensors of a control system, cyclically detecting actual states of the technical industrial process and transmitting the detected actual states to a common central unit of the control system via a first protected connection of a first open communication network, said first protected connection being common to the sensors and each sensor transmitting the detected actual states to the common central unit once within a specified time window, wherein a respective transmitter-side sub-region is assigned to the respective sensor within the time window within which sub-region the respective sensor supplies the actual states detected by said sensor to the first open communication network;
   with the common central unit, cyclically ascertaining control signals for the technical industrial process while taking into consideration the detected actual states transmitted to the central unit and transmitting the ascertained control signals to multiple actuators of the control system via a second protected connection of a second open communication network, said second protected connection being common to the actuators, wherein the common central unit transmits the ascertained control signals determined for the respective actuator to each actuator once within the specified time window;
   the actuators cyclically acting on the technical industrial process commensurate with the control signals transmitted to the actuators; and
   the central unit receiving the transmitted actual states within a respective receiver-side sub-region of the time window, with the receiver-side sub-region corresponding to the respective transmitter-side sub-region;
   wherein the transmitter-side sub-regions of the sensors are specified such that the receiver-side sub-regions are disjointed from one another.

2. The method of claim 1, further comprising:
   initially setting up temporarily a respective transmitter-side sub-region within the time window;
   establishing, with the common central unit, a correspondence between each transmitter-side sub-region and a corresponding receiver-side sub-region; and
   shifting the transmitter-side sub-regions within the time window such that the corresponding receiver-side sub-regions are disjointed from one another.

3. The method of claim 2, further comprising:
   communicating from a respective sensor to the common central unit via a respective sequence of sequentially successive line sections of the first open communication network, wherein a line section of the respective sequence is connected to directly adjacent line sections of the respective sequence via a node;
   each node forwarding the actual states transmitted by the respective sensor with a respective delay time, which lies between a predetermined minimum value and a predetermined maximum value; and
   determining the respective receiver-side sub-region, starting from the transmitter-side sub-region assigned to the respective sensor, by adding up the predetermined minimum values of the nodes and by adding up the predetermined maximum values of the nodes.

4. The method of claim 3, wherein the predetermined minimum values are set to zero.

5. The method of claim 2, wherein the first open communication network and the second open communication network have at least one common line section via which both the actual states are transmitted to the common central unit and the control signals are transmitted to the actuators.

6. A control system for controlling a technical industrial process, comprising:
   a plurality of sensors,
   a plurality of actuators, and
   a common central unit,
   a first open communication network connecting the plurality of sensors with the common central unit,
   via a second open communication network connecting the common central unit and the actuators,
   wherein the control system is configured to
      cyclically detect, with sensors of a control system, actual states of the technical industrial process and transmit the detected actual states to a common central unit of the control system via a first protected connection of the first open communication network, said first protected connection being common to the sensors and each sensor transmitting the detected actual states to the common central unit once within a specified time window, wherein a respective transmitter-side sub-region is assigned to the respective sensor within the time window within which sub-region the respective sensor supplies the actual states detected by said sensor to the first open communication network;

with the common central unit, cyclically ascertain control signals for the technical industrial process while taking into consideration the detected actual states transmitted to the central unit and transmit the ascertained control signals to multiple actuators of the control system via a second protected connection of the second open communication network, said second protected connection being common to the actuators, wherein the common central unit transmits the ascertained control signals determined for the respective actuator to each actuator once within the specified time window;

cause the actuators to cyclically act on the technical industrial process commensurate with the control signals transmitted to the actuators; and receive at the central unit the transmitted actual states within a respective receiver-side sub-region of the time window, with the receiver-side sub-region corresponding to the respective transmitter-side sub-region;

wherein the transmitter-side sub-regions of the sensors are specified such that the receiver-side sub-regions are disjointed from one another.

* * * * *